United States Patent [19]  
Furuno

[11] Patent Number: 4,655,909  
[45] Date of Patent: Apr. 7, 1987

[54] WATER-DEIONIZING SYSTEM  
[75] Inventor: Nobuo Furuno, Amagasaki, Japan  
[73] Assignee: Nippon Paint Co., Ltd., Osaka, Japan  
[21] Appl. No.: 682,872  
[22] Filed: Dec. 18, 1984  
[30] Foreign Application Priority Data  
Dec. 20, 1983 [JP] Japan ................................. 58-241357  
[51] Int. Cl.$^4$ .............................................. C02F 1/42  
[52] U.S. Cl. .................................... 210/90; 210/96.1; 210/167; 210/266; 210/284; 210/900  
[58] Field of Search ............... 210/638, 650, 662, 663, 210/669, 685, 96.1, 167, 266, 284, 900, 90, 130, 195.1, 195.2, 196, 97, 269, 264, 420

[56] References Cited  
U.S. PATENT DOCUMENTS

| 2,938,868 | 5/1960 | Carlson et al. | 210/662 |
| 3,276,458 | 10/1966 | Iversen et al. | 210/900 |
| 3,334,044 | 8/1967 | Satterlee | 210/662 |
| 3,454,491 | 7/1969 | Colburn | 210/662 |
| 3,855,128 | 12/1974 | Shaltz et al. | 210/130 |
| 3,870,033 | 3/1975 | Faylor et al. | 210/900 |
| 4,182,676 | 1/1980 | Casolo | 210/669 |
| 4,246,101 | 1/1981 | Selby | 210/662 |
| 4,276,177 | 6/1981 | Smith | 210/669 |
| 4,280,912 | 7/1981 | Berry et al. | 210/900 |
| 4,332,679 | 6/1982 | Hengst et al. | 210/97 |
| 4,383,920 | 5/1983 | Muller et al. | 210/264 |

Primary Examiner—Ivars Cintins  
Attorney, Agent, or Firm—Millen & White

[57] ABSTRACT

A water-deionizing system comprising a reservoir for receiving a quantity of water to be deionized, a first ion-exchanger unit capable of removing anions from said water, and a second ion-exchanger unit capable of removing cations from said water. The first and second ion-exchanger units are connected to said reservoir to form separate flow paths or circuits for circulating water from the reservoir through the units separately in parallel. The system permits efficient production of a relatively large amount of water in a batchwise operation and also facilitates the regeneration of saturated ion-exchangers.

13 Claims, 5 Drawing Figures

WATER-DEIONIZING SYSTEM

BACKGROUND AND OBJECTS OF THE INVENTION

This invention relates to a water-deionizing system for producing ultrapure water having a specific electric conductivity of the order of less than 0.1 μS(micro Siemens)/cm at 25° C.

The demand for ultrapure water is ever increasing for washing various electronic and other devices to remove electrolytic contaminants of which presence adversely affects the performance of such devices.

Ultrapure water may be conventionally produced by polishing suitable raw water such as from public water supply using various water-purifying techniques such as reverse osmosis, electrodialysis, deionization, distillation and the like. Usually a plurality of these techniques is employed in combination. In order to produce ultrapure water having a specific electric conductivity close to the theoretical limit of 0.05 μS/cm at 25° C., it is essential to treat water with both cationic and anionic ion-exchangers. This deionizing step may be conveniently accomplished by using commercially available cartridges commonly referred to as "water polisher" containing both anionic and cationic ion-exchangers as a mixed bed. Unfortunately, such cartridges are of limited use for producing a large quantity of ultrapure water for washing and other purposes because they are not practically capable of regenerating their ion-exchange capacities and thus have to be disposed once their capacities have been essentially saturated. Since these cartridges are usually prefilled with an intimate mixture of anion and cation exchangers and since separate regenerating agents are required for anion and cation exchangers, the mixture must be separated into its components before permitting the regeneration thereof. However, experiments have shown that this separation is practically very difficult to perform at water-purifying plants.

Accordingly, it is a principal object of the present invention to provide a water-deionizing system for producing ultrapure water which is simple in construction, easy in operation and suitable for treating water at sites where a relatively large amount of water is needed for washing and other purposes.

It is another principal object of the present invention to provide such a water-deionizing system which permits regeneration and repeated use of ion-exchangers.

Other objects and advantages will be apparent to those skilled in the art as the description proceeds.

SUMMARY OF THE INVENTION

According to the invention, a water-deionizing system is provided comprising:

a reservoir for receiving a quantity of water to be deionized;

a first ion-exchanger unit capable of removing anions from said water;

a second ion-exchanger unit capable of removing cations from said water;

flow path means for circulating water from said reservoir through said first ion-exchanger unit and said second ion-exchanger unit upwardly back to said reservoir; and means for pumping water through said flow path means.

Preferably said flow path means comprise first and second flow paths for circulating water from said reservoir through said first and second ion-exchanger unit separately back to said reservoir.

The system preferably further comprises a third flow path including a filter means for circulating water from said reservoir through the filter back to said reservoir for filtering off any particulate matter from said water. Means for pumping water through said third flow path is also provided.

In operation, a quantity of raw water is placed in the reservoir and pumping means are actuated to circulate water through the first and second ion-exchanger units and preferably through the filter repeatedly until the specific electric conductivity of circulating water decreases less than a predetermined level. The resulting deionized water may be drained for washing or storage purposes and the system may be refilled with another batch of raw water to deionize it in the next run.

When one or both ion-exchanger units reach close to the saturation point, they may be detached from the system and regenerated separately without the need for complicated separation into anionic and cationic exchangers.

DETAILED DESCRIPTION OF PREFERRED EMBODIMENTS

Figure 1:
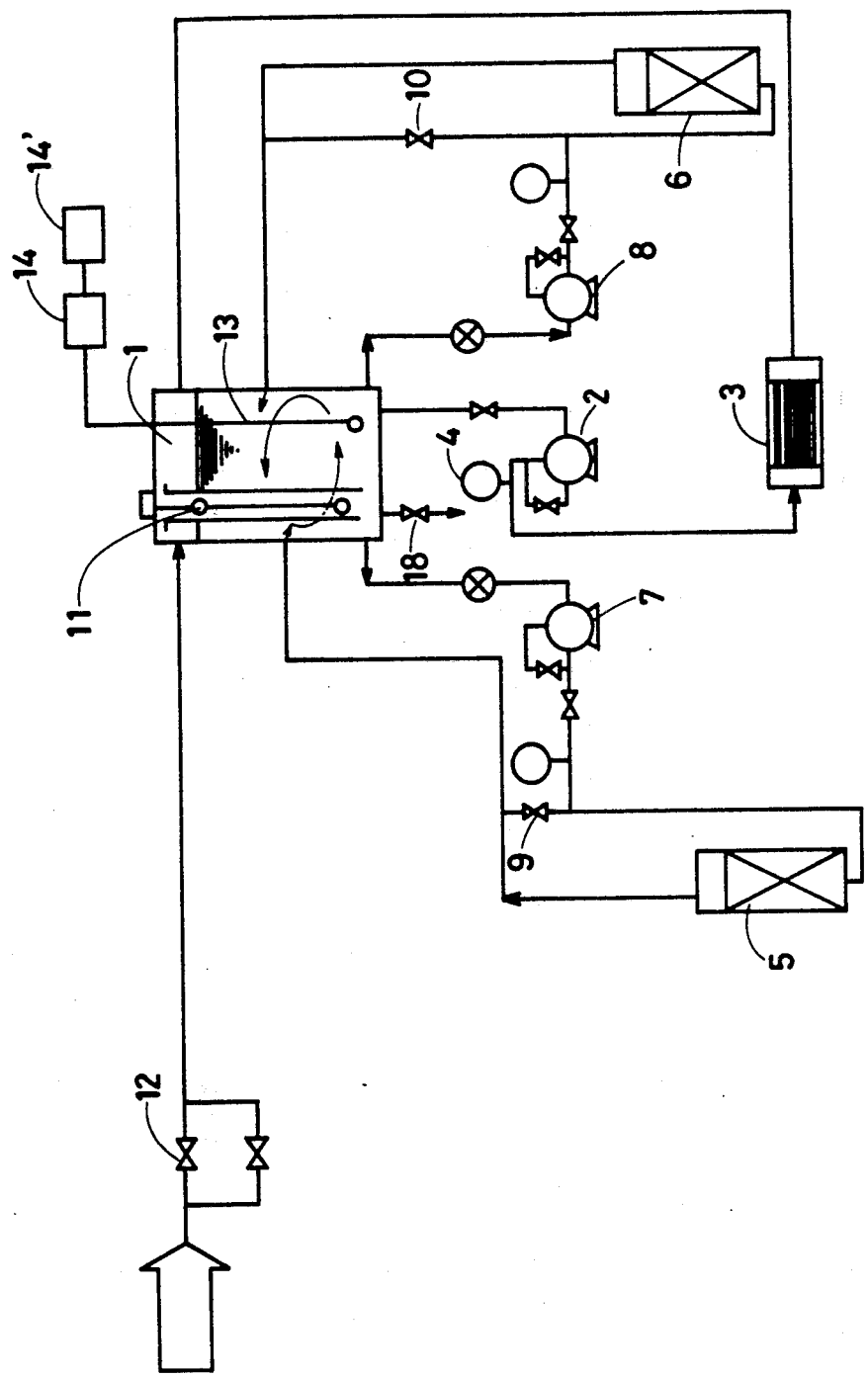
FIG. 1 is a schematic illustration of a water-deionizing system constructed in accordance with one embodiment of the present invention.

Referring to FIG. 1, a water-deionizing system according to the first embodiment of the present invention is schematically illustrated. The system includes a closed reservoir 1 for receiving a quantity of water from raw water supply such as public water supply via a magnetic valve 12. A level meter 11 detects the level of water received in the reservoir 1 and signals the valve 12 to close when a predetermined volume of raw water is received.

The system includes three separate flow paths through which water in the reservoir 1 may be circulated.

The first flow path or circuit extends from the reservoir 1 through a pump 7 and then a first ion-exchanger unit 5 back to the reservoir 1. The ion-exchanger unit 5 is filled, preferably loosely, with an amount of an ion-exchanger capable of removing anions, for example, anion exchange resins. Lines connecting reservoir 1, pump 7 and ion-exchanger unit 5 in a flow circuit are provided as shown. The ion-exchanger unit 5 is connected at its lower end to pump 7 and at its upper end to reservoir 1 so that water passes through the unit upwardly. A bypass or shunt including a valve 9 which bypasses ion-exchanger unit 5 is provided downstream pump 7. This bypass serves to regulate the flow rate passing through the unit 5 without the need for changing the pumping rate through the entire circuit.

The second flow path or circuit may be identical to the first flow circuit in construction except that a second ion-exchanger unit 6 contains therein an amount of an ion-exchanger capable of removing oppositely charges ions, for example, cation exchange resins. Lines are provided to form the second flow path or circuit so that water is circulated from reservoir 1 through pump 8 and second ion-exchanger unit 6 back to reservoir 1. A bypass including a valve 10 which bypasses ion-exchanger unit 6 is also provided downstream pump 8 for the same purpose as in the first circuit.

The third flow path or circuit extends from reservoir 1 through a pump 2 and a filter 3 back to reservoir 1. A pressure gauge 4 is positioned downstream pump 2 and upstream filter 3 for detecting clogging of filter 3 which is indicated by a pressure sensed by gauge 4 higher than a predetermined level.

The system preferably includes means for determing the specific electric conductivity of water in reservoir 1. To this end a conventional cell 13 placed in reservoir 1 is connected a measuring device 14 and data therefrom are recorded on a recorder 14'.

In operation, raw water from suitable supply is introduced into reservoir 1 via valve 12 until level meter 11 indicates that a predetermined volume of water has been received. Then pumps 2, 7 and 8 are actuated with associated valves open to circulate water from reservoir 1 through filter 3, first and second ion-exchanger units 5, 6 in parallel back to reservoir 1 repeatedly. Water is progressively deionized as it passes through first and second ion-exchanger units in parallel repeatedly. Particulate contaminant matters which may be initially present in raw water or generated from ion-exchanger materials are filtered off by filter 3.

When the specific conductivity of circulating water decreases less than a predetermined level, for example less than 0.1 $\mu$S/cm and close to 0.05 $\mu$S/cm at 25° C., the operation of pumps 2, 7 and 8 is terminated and the resulting deionized water is drained from reservoir 1 through a drain valve 18 for washing and other purposes.

Figure 2:
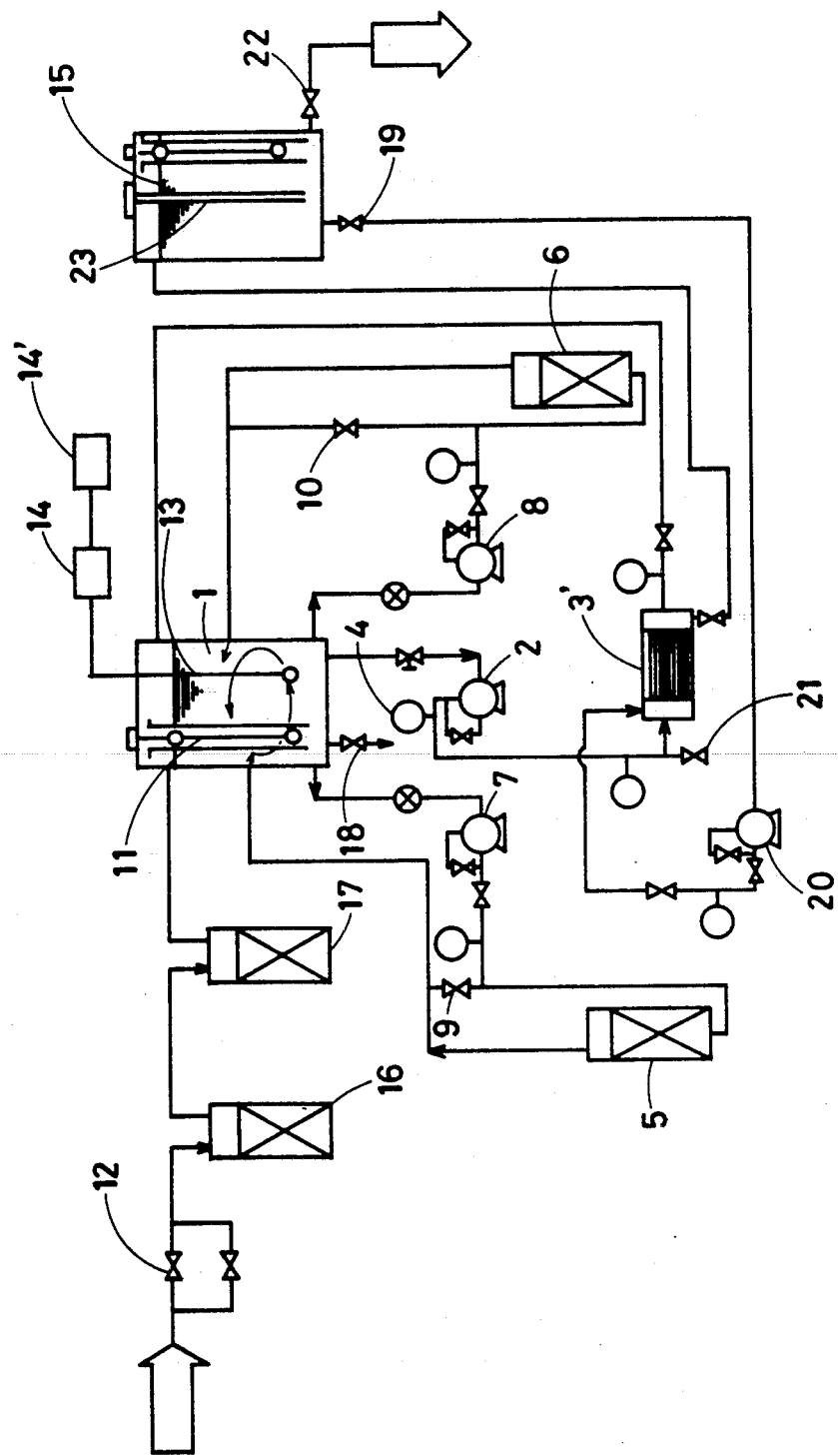
FIG. 2 is a similar view to FIG. 1 of a water-deionizing system constructed in accordance with another embodiment of the present invention.

Referring to FIG. 2, another embodiment of the water-deionizing system of the present invention is illustrated. In this figure, the same reference numerals designate the same element as in FIG. 1 and the entire system operates in the same way as FIG. 1 embodiment except as follows.

The system shown in FIG. 2 includes a flow path which extends from reservoir 1 through pump 4 to an ultrafiltration device 3'. A return line for the retenate connects ultrafiltration device 3 back to reservoir 1. A pressure gauge 4 is positioned upstream the device 3 to warn clogging the device 3'. The filtrate side of ultrafiltration device 3' is connected to a storage tank 15 for storing deionized and ultrafiltered water. A line including a valve 19 connects purified water tank 15 to the filtrate side of ultrafilter 3' via a pump 20 for washing device 3 by passing purified water from tank 15 through the device in reverse direction to a drain 21.

The system may also include in raw water supply line an activated carbon filter and a microfilter for pretreating raw water before it is fed to reservoir 1.

In operation, raw water is introduced into reservoir 1 via valve 12, various filters 16 and 17 until level sensor 11 indicates that a predetermined volume of water has been received. Then pumps 7 and 8 are actuated with associated valves open to circulate water from reservoir 1 through first and second ion-exchanger units 5 and 6 in parallel repeatedly. Pump 2 and its associated valve are not in operation in this stage. When the specific conductivity of circulating water as sensed by sensor 14 decreases less than a predetermined level, pump 2 is actuated to filter the deionized water through ultrafiltration device 3'. The filtrate is passed to purified water tank 15 for storage. A UV lamp 25 is positioned within tank 15 to keep the interior of tank 15 sterile. The retenate from ultrafiltration device 3' is returned to reservoir 1 for further treatment in the system. When the specific conductivity of circulating water increases greater than the predetermined level, the operation of pump 2 is stopped and water is circulated only through ion-exchanger units 7 and 8 in parallel until the specific conductivity decreases lower than the predetermined level.

When a predetermined water is drained from reservoir 1 as sensed by level sensor 11, all of pumps 2, 7 and 8 are stopped and a drain valve 18 is opened to empty reservoir 1. Before refilling reservoir 1 with fresh raw water for the next run, ultrafiltration device is cleaned with purified water stored in tank 15. This may be accomplished by opening valves 19 and 20 and operating pump 20 to force purified water through device 3 in reverse direction. Purified water stored in tank 15 may be drained by opening valve 22 for washing and other purposes.

Figure 3:
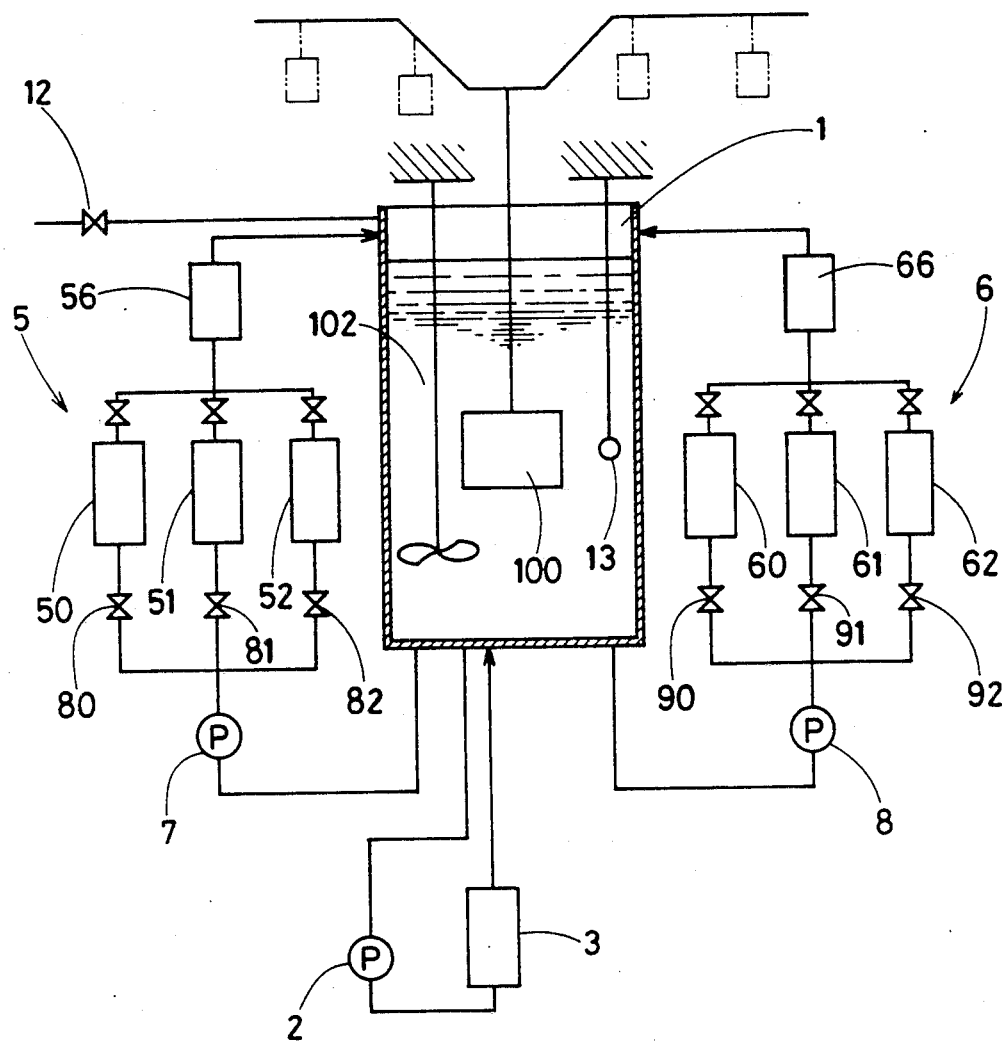
FIG. 3 is a similar view to FIG. 1 of a water-deionizing system in accordance with a further embodiment of the present invention.

A further embodiment of the water deionizing system of the present invention is shown in FIG. 3. Again, the same reference numerals identify the same elements as in FIG. 1 and FIG. 2.

In this embodiment, the first and second ion-exchanger units 5 and 6 each comprises a plurality of vertically positioned ion-exchanger beds designated by the reference numerals 50–52 and 60–62, respectively. These beds in one group are connected in parallel. Positioned upstream these beds are associated valves 80–82 and 91–92. In addition to filter 3, filters 56 and 66 are provided downstream units 5 and 6, respectively.

The system shown in FIG. 3 is useful for washing an article 100 with deionized water in reservoir 1. A stirrer 102 is provided within reservoir 1 to promote leaching ionic contaminants from article 100.

In this arrangement, the number of ion-exchanger beds to be operated in one time may be increased or decreased depending upon the amount of ions to be removed by controlling their respective valves.

This arrangement also facilitates to detach a particular bed or beds from the system for regenerating ion-exchange capacity without stopping the operation of the entire system.

EXAMPLE

A deionizing system was constructed as shown in FIG. 1.

A filter sold by Japan Organo Co., Ltd., under the name of PF filter was used as filter 3.

Three liters of a strongly basic anion-exchange resin (DUOLITE A-101D; Sumitomo Chemical Co., Ltd.; quarternary ammonium type; total capacity 1.3 meq/ml; true density 1.10; water content 47–55%) were treated with 2N NaOH twice and washed with tap water three times. The treated resin was loosely packed within an ion-exchange tower to form the first ion-exchanger unit 5.

Three liters of strongly acidic cation-exchange resin (DUOLITE C-20; Sumitomo Chemical Co., Ltd.; sulfonate type; total capacity 2.0 meq/ml; true density 1.32; water content 43–47%) were treated with 2N HCl twice and washed with tap water three times. The treated resin was loosely packed within another ion-exchange tower to form the second ion-exchange unit 6.

Five liters of city water (specific conductivity 150 $\mu$S/cm) were introduced into reservoir 1 and repeatedly circulated through first and second ion-exchanger units 5 and 6 and also through filter 3. The flow rate passing through each ion-exchanger unit was controlled at 20 liter/minutes (space velocity 7 liter/liter).

Figure 4:
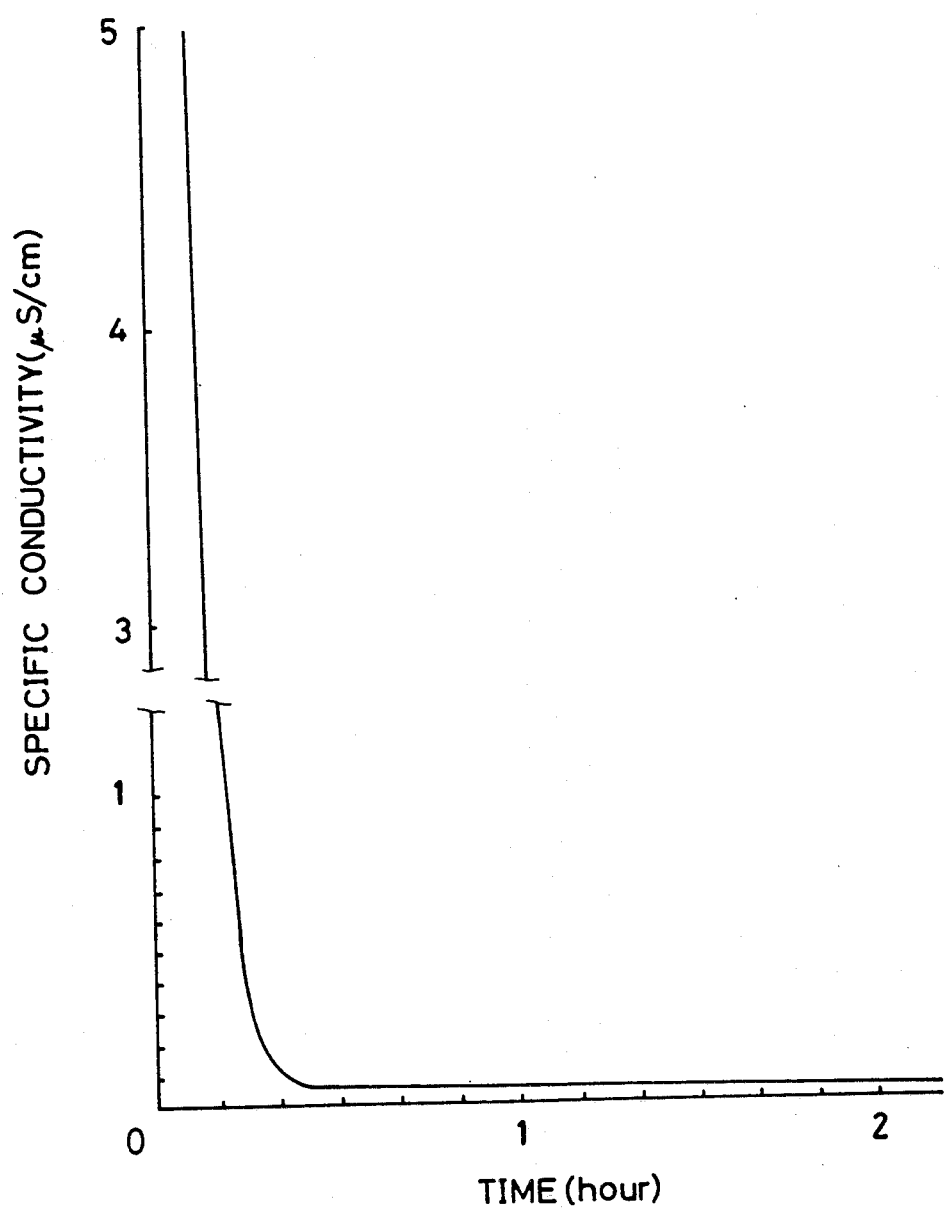
FIG. 4 is a graph showing the operational result of Example in terms of specific conductivity (μS/cm) versus time (hour).

The change in specific conductivity versus time is shown in FIG. 4. As shown, the specific conductivity decreased to 1 $\mu$S/cm after about 10 minutes and then 0.05 $\mu$S/cm after about 30 minutes.

For comparative purposes, a 1:1 mixture of the above described anionic and cationic ion-exchange resins was packed in both first and second ion-exchanger units 5, 6 and a similar test was repeated except that water was passed through units 5, 6 downwardly.

Figure 5:
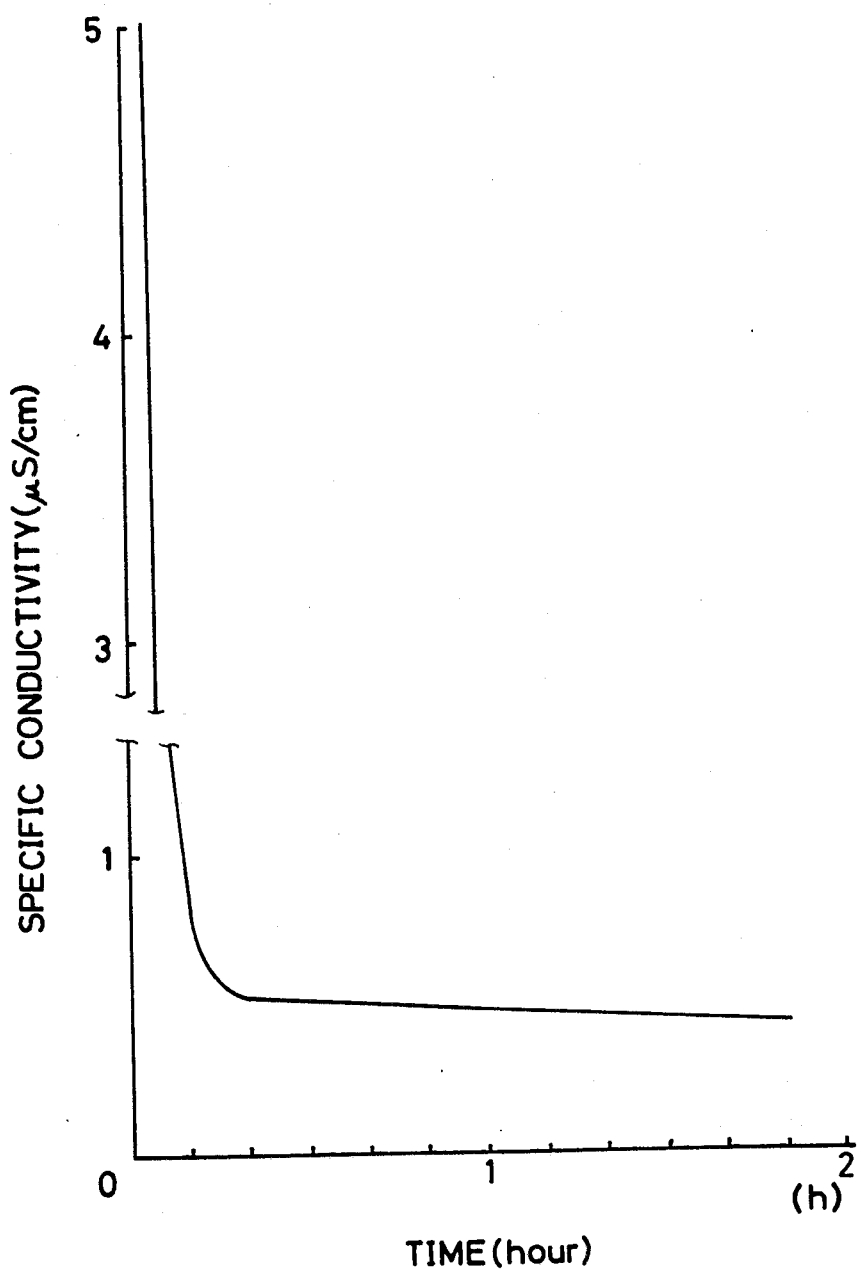
FIG. 5 is a similar graph to FIG. 4 showing the operational results of Comparative Example.

The change in specific conductivity versus time is shown in FIG. 5. As shown, the specific conductivity decreased to 1 $\mu$S/cm within about 5 minutes but no less than 0.5 $\mu$S/cm by continued operation.

By reversing the direction of circulating water through the above mixed bed ion-exchanger units 5, 6, a specific conductivity of 0.05 $\mu$S/cm was obtained after about 30 minutes operation. However, it was practically impossible to completely separate the mixture into anionic and cationic components.

While particular embodiments of the invention have been shown and described, it will be obvious to those skilled in the art that changes and modifications may be made without departing from the true spirit and scope of the invention which is defined in the appended claims. For example, first and second ion-exchanger units 5 and 6 may be connected in series and a single flow path may be provided to circulate water from reservoir 1 through the first and second ion-exchanger units 5 and 6 in series upwardly back to the reservoir 1.

I claim:

1. A batch-wise water-deionizing system comprising:
  a reservoir for receiving a batch of water to be deionized;
  a first anionic ion-exchanger unit capable of removing the anions from said batch of water;
  a second cationic ion-exchanger unit capable of removing the cations from said batch of water;
  closed-loop flow path means for circulating water from said reservoir through said first ion-exchanger unit, through said second ion-exchanger unit and back to said reservoir; and means associated with said flow path means for pumping said batch of water repeatedly therethrough,
  said first and second ion-exchanger units being positioned in said flow path so that the batch of water pumped thereto flows upwardly therethrough.

2. The water-deionizing system as claimed in claim 1, wherein said first and second ion-exchanger units are connected in parallel in said flow path means, which comprises a first flow path for circulating water between said reservoir and said first ion-exchanger unit and a separate second flow path for circulating water between said second ion-exchanger unit and said reservoir.

3. The water-deionizing system as claimed in claim 2, further comprising water filter means, a third flow path for circulating water from said reservoir through said filter means and back to said reservoir; and means associated with said third flow path for pumping said batch of water therethrough.

4. The water-deionized system as claimed in claim 3, wherein said filter means comprises an ultrafiltration device having a return line in said third flow path for returning a retenate fraction from said ultrafiltration device to said reservoir and means for allowing a filtrate fraction to drain from said ultrafiltration device.

5. The water-deionizing system as claimed in claim 4, further comprising means for measuring the specific electric conductivity of water circulating through the system.

6. The water-deionizing system as claimed in claim 3, further comprising means for measuring the specific electric conductivity of water circulating through the system.

7. The water deionizing system as claimed in claim 3, further comprising a pressure gauge in said third flow path downstream of said water pumping means and upstream of said filter means for detecting clogging of said filter means.

8. The water deionizing system as claimed in claim 3, wherein said first and second ion-exchanger units each comprises a plurality of ion-exchanger beds connected in parallel;
  wherein said first and second ion-exchanger units are detachable from the system for regeneration when the ion exchange means therein become exhausted; and
  wherein said first and second flow paths each comprise a by-pass path for by-passing the ion exchanger unit therein and valve means for regulating the proportion of water which is by-passed.

9. The water deionizing system as claimed in claim 8, further comprising a pressure gauge in said third flow path downstream of said water pumping means and upstream of said filter means for detecting clogging of said filter means.

10. The water-deionizing system as claimed in claim 2, wherein said first and second ion-exchanger units each comprises a plurality of ion-exchanger beds connected in parallel.

11. The water-deionizing system as claimed in claim 10, further comprising means for measuring the specific electric conductivity of water circulating through the system.

12. The water-deionizing system as claimed in claim 2 wherein said first and second ion-exchanger units are detachable from the system for regeneration when the ion change means therein become exhausted.

13. The water deionizing system as claimed in claim 2, wherein said first and second flow paths each comprise a by-pass path for by-passing the ion exchanger unit therein and valve means for regulating the proportion of water which is by-passed.

* * * * *